United States Patent [19]

Philippe

[11] Patent Number: 4,922,533

[45] Date of Patent: May 1, 1990

[54] HIGH SECURITY EVOLUTIVE CODING PROCESS AND DEVICE FOR CARRYING OUT THIS PROCESS

[75] Inventor: Patrick Philippe, Jambville, France

[73] Assignee: Neiman, Courbevoie, France

[21] Appl. No.: 114,005

[22] Filed: Oct. 29, 1987

[30] Foreign Application Priority Data

Oct. 31, 1986 [FR] France ............................ 86 15170

[51] Int. Cl.$^5$ ............................................. H04L 9/02
[52] U.S. Cl. ........................................ 380/46; 380/28
[58] Field of Search ................ 380/46, 35, 28; 375/1; 358/263

[56] References Cited

U.S. PATENT DOCUMENTS

| | | | |
|---|---|---|---|
| 3,891,793 | 6/1975 | DeLoye | 358/263 |
| 4,071,692 | 1/1978 | Weir et al. | 380/46 X |
| 4,241,447 | 12/1980 | Epstein | 375/1 |
| 4,363,130 | 12/1982 | Ramsay et al. | 380/35 |
| 4,606,039 | 8/1986 | Nicolas et al. | 375/1 |

Primary Examiner—Stephen C. Buczinski
Assistant Examiner—Bernard Earl Gregory
Attorney, Agent, or Firm—James Creighton Wray

[57] ABSTRACT

An evolutive coding process using a pseudo-random discontinuous function for coding remote controls, such as for automobiles. A message containing at least two pseudo-random values calculated by the pseudo-random discontinuous function is transmitted. Preferably the pseudo-random values are successive values of the pseudo-random discontinuous function, and the message optionally includes a code derived as a function of a specific base code associated with the system. The general preferred form of complete code message may take the form T(C) plus FA(C,n−1), plus FA(C,n) where T is a continuous function and FA is a pseudo-random discontinuous function.

4 Claims, 1 Drawing Sheet

HIGH SECURITY EVOLUTIVE CODING PROCESS AND DEVICE FOR CARRYING OUT THIS PROCESS

BACKGROUND TO THE INVENTION

This invention relates to an improvement to evolutive codings utilizing a pseudo-random discontinuous function.

Electronic codings for security devices, especially for remote control, belong to one of three main groups:
1. Fixed codes.
2. Codes that vary according to a continuous law.
3. Codes that vary according to a discontinuous law.

The first two types of code suffer from the serious disadvantage of permitting relatively easy violation by recording of the signal transmitted for the first group and by recording several signals in order to deduce the law of variation for the second group.

The codes of the third type possess a much higher level of security, because the code changes after each use in accordance with a discontinuous mathematical function as a result of the generating pseudo-random numbers, this law being different for each transmitter-receiver assembly and being linked to a specific base code.

Nevertheless, such discontinuous mathematical functions which generate pseudo-random numbers are of necessity restricted functions that draw lots between a minimum and a maximum value. The maximum value may be deduced relatively easily according to the number of bits transmitted. Systematic scanning of all the values up to the maximum value will generally enable the security device to be unlocked.

OBJECT OF THE INVENTION

An object of the present invention is to improve considerably the security of devices using such codings.

SUMMARY OF THE INVENTION

According to the invention there is provided an evolutive coding process utilizing a pseudo-random discontinuous function, wherein a message containing at least two pseudo-random values calculated by said function is transmitted. Preferably, said pseudo-random values are successive values of said pseudo-random discontinuous function. With advantage, the message contains, in addition, a code deduced by a continuous function from a specific base code for each system.

DESCRIPTION OF PREFERRED EMBODIMENT

If the specific base code of the system is termed C, it will be possible to obtain this code C by wiring (matrix) or by electronic memorisation of a number.

A transformation of continuous function T(C) of the code C is created electronically.

A discontinuous, pseudo-random function FA (C,N), dependent upon the code C and upon the number N of transmissions, is also created.

According to one example of embodiment of the invention, the message transmitted and which must be read to enable the system to be unlocked will be composed as follows.

$$T(C) + FA(C, n-1) + FA(C, n).$$

That is to say this message will comprise on each occasion a first portion T(C), which is the value of continuous function of the base code C, a second portion $FA(C, n-1)$, which is the value of the pseudo-random, discontinuous function corresponding to the base code C for the $(n-1)$th transmission, and a third portion $FA(C,n)$, which is the value of the same function for the nth transmission.

Since the function $FA(C,n)$ is programmed into the transmission and reception microcomputers, it is known only to the designer, and the transmission number N, which is also memorised by the microcomputers, if no longer accessible.

If the upper limit of the pseudo-random draw is sufficiently high, for example 999,999 the probability of discovering the two values $FA(C, n-1)$ and $FA(C,n)$ by repeated attempts is extremely low, of the order of $10^{-12}$ in this example.

BRIEF DESCRIPTION OF DRAWINGS

The present invention includes a transmitter/receiver circuit for carrying our the process disclosed above, which circuit will now be described by way of example with reference to be accompanying circuit diagrams, FIGS. 1 and 2.

Figure 1:
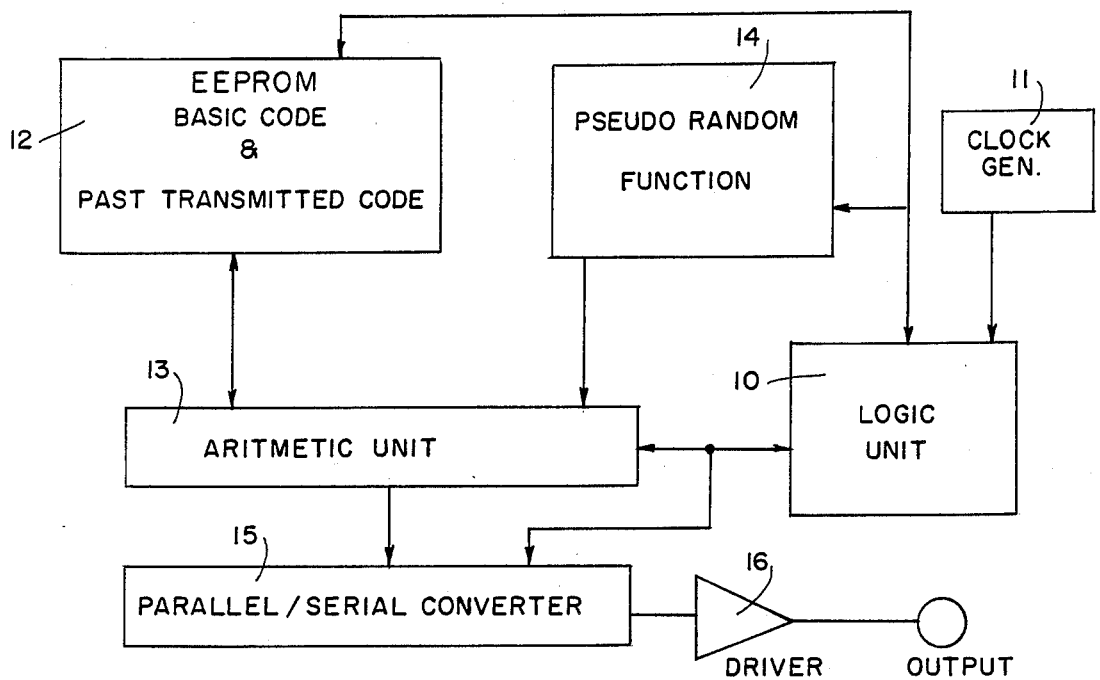
Referring to FIG. 1, the transmitter portion of the circuit comprises a logic unit 10 controlled by a clock generator 11, an EEPROM 12, an arithmetic unit 13, a half random function unit 14 between said logic unit 10 and the arithmetic unit 13, a parallel/serial converter 15 connected to the output of the arithmetic unit 13, and a driver 16 controlled by the output from the converter 14.
Figure 2:
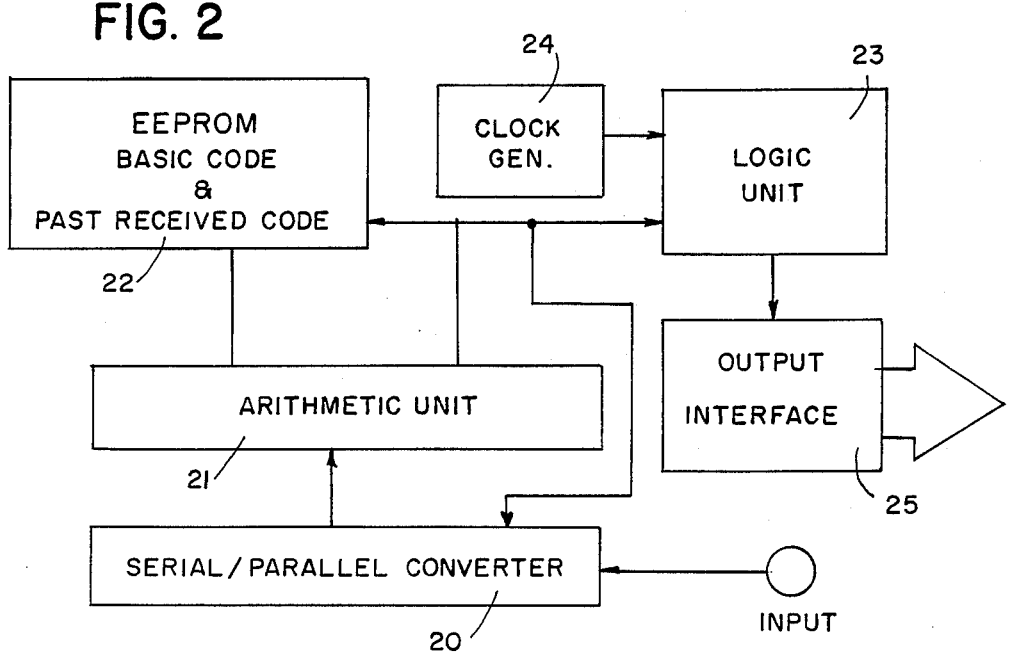
Referring to FIG. 2, the receiver portion comprises a serial/parallel converter 20 for receiving an input signal, an arithmetic unit 21, an EEPROM 22, a logic unit 23, the functions of which are controlled by a clock generator 24 and an output interface 25, said logic unit having control outputs connected respectively to the EEPROM, arithmetic unit, converter and the output interface 25 respectively.

I claim:

1. An evolutive code process using a pseudo-random discontinuous function, wherein a message containing at least two pseudo-random values calculated by said function is transmitted and wherein further the message contains, in addition, a code calculated by calculation of a continuous function of a specific base code for each system.

2. A process according to claim 1, wherein said pseudo-random values are successive values of said pseudo-random discontinuous function.

3. A device for carrying out an evolutive process according to claim 1, comprising means for transmitting a message containing at least two pseudo-random values calculated by said function and wherein the message contains, in addition, a code calculated by calculation of a continuous function of a specific base code for each system.

4. A device according to claim 3, wherein said pseudo-random values are successive values of said pseudo-random discontinuous function.

* * * * *